United States Patent [19]

Lundberg

[11] 4,197,099

[45] Apr. 8, 1980

[54] APPARATUS FOR MOUNTING AND HOLDING FILTER BAGS AND THE LIKE

[76] Inventor: Bo E. I. H. Lundberg, Centeno 686, Mexico City 8, Mexico

[21] Appl. No.: 855,318

[22] Filed: Nov. 28, 1977

[30] Foreign Application Priority Data

Nov. 30, 1976 [MX] Mexico .................................. 167234
Oct. 17, 1977 [MX] Mexico .................................. 170963

[51] Int. Cl.² ...................... B01D 29/16; B01D 46/02
[52] U.S. Cl. ........................................ 55/378; 55/380; 55/484; 55/499; 55/509; 55/DIG. 12
[58] Field of Search ................. 55/374, 378, 380, 499, 55/501, 509, 511, DIG. 12, DIG. 26, 483, 484; 210/484, 485, 493 FR

[56] References Cited

U.S. PATENT DOCUMENTS

| | | | |
|---|---|---|---|
| 1,813,896 | 7/1931 | Paine | 55/378 |
| 2,964,127 | 12/1960 | Korn | 55/509 |
| 3,154,393 | 10/1964 | Klein et al. | 55/501 |
| 3,164,456 | 1/1965 | Brainerd, Jr. et al. | 55/499 |
| 3,204,391 | 9/1965 | Schwab | 55/380 |
| 3,401,505 | 9/1968 | Ballard | 55/374 |
| 3,418,794 | 12/1968 | Roberts | 55/509 |
| 3,443,366 | 5/1969 | Schwab | 55/378 |
| 3,537,241 | 11/1970 | Wiegel et al. | 55/378 |
| 3,774,377 | 11/1973 | Bishop | 55/501 |
| 3,853,510 | 12/1974 | Meyer et al. | 55/380 |

FOREIGN PATENT DOCUMENTS 2449330 4/1976 Fed. Rep. of Germany ............. 55/380

Primary Examiner—Frank W. Lutter
Assistant Examiner—Gregory N. Clements
Attorney, Agent, or Firm—Hill, Van Santen, Steadman, Chiara & Simpson

[57] ABSTRACT

The present invention refers to the mounting of filter bags and the like of the kind comprising the mounting of such filter bags in a frame which holds them by means of a holding ring and which applies pressure against the outer walls of the frame, securing the lip of the bags between the body of the frame and the holding ring.

6 Claims, 6 Drawing Figures

APPARATUS FOR MOUNTING AND HOLDING FILTER BAGS AND THE LIKE

BACKGROUND OF THE INVENTION

At present the conventional system for mounting filter bags comprise more than two movable parts, such as arms, rotary springs, etc., which are attached to the frame by means of flanges, or else the said bags are secured to the frame with staples or clips; this does not consistently guarantee adequate mounting of the filter bags; furthermore this system is subject to failure of the mechanical means used.

At the present time there is no means or system permitting of mounting the bags by simple rather than complicated steps and using a minimum number of structural pieces which are easily manipulated, allowing the mounting of the bag around its entire periphery, and finally are assuring both hermetic sealing and structural strength.

OBJECTS OF THE INVENTION

Accordingly it is one object of the invention to provide apparatus for mounting filter bags consisting of a small number of structural parts, easily handled and failure-proof.

An additional object of the invention is the construction of an apparatus for mounting filter bags and the like, in which the entire lip or periphery of the bags is suitably secured to the frame of the apparatus and in which the elements which contribute to extending the bag can be located in at least two different positions permitting of placing the bags in at least the said two positions.

RESUME OF THE INVENTION

The invention which is the object of this application consists essentially of an external frame, provided with an interior projection and a flange pointed toward the inside of the said frame, a locking ring which applies pressure against the inside wall of the outer frame and which in operation is placed between the flange and the interior projection of the said frame, a secondary frame which permits holding and giving good shape to the filter bags, and which shapes the supports which are placed between adjoining filter elements.

DETAILED DESCRIPTION OF THE INVENTION

Figure 1:
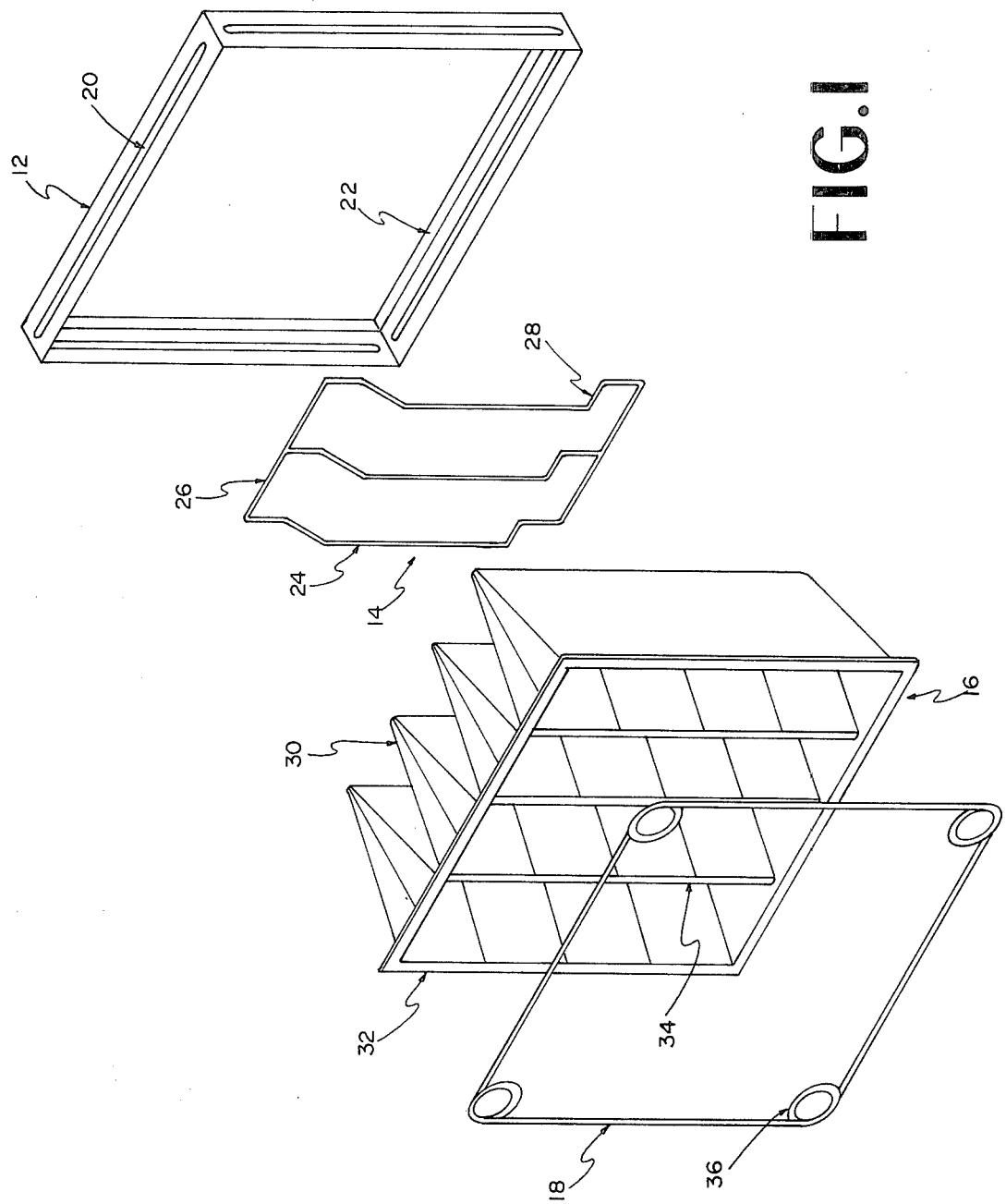
FIG. 1 is a conventional exploded perspective view of the apparatus which is the object of this application.
Figure 2:
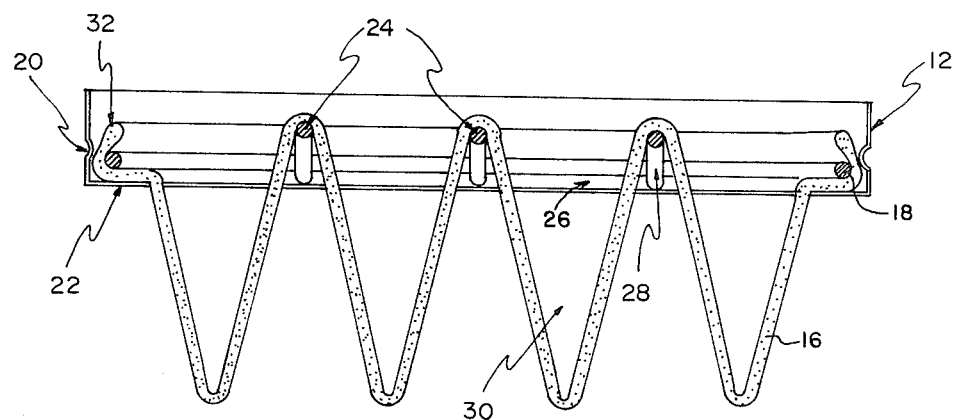
FIG. 2 is a view of the frame in cross-section, with the filter bags mounted on the frame.

As shown in the drawings attached, particularly FIG. 1, the apparatus which is the object of this application, identified by general reference No. 10 consists of a main frame 12, a secondary frame 14 and a ring 18. The main frame 12, of rectangular shape, exhibits a projection 20 which extends substantially around the entire periphery of the side walls of the said frame 12, and serves to hold ring 18 in locked position.

Frame 12 has a peripheral flange 22 which is directed inward toward the body of the frame. Both flange 22 and projection 20 participate in mounting the different parts of the apparatus, such as secondary frame 14 filter bag 16 and ring 18, which elements remain below projection 20; the periphery of the filter bag is seized between frame 12 and retaining ring 18.

In the embodiment shown in FIG. 1, the element which permits of keeping filter bag 16 properly extended and supported is represented by frame 14 consisting of three longitudinal bars 24 bent at their ends, thus forming an incline 28. Said longitudinal bars 24 are joined at their ends by respective transverse bars 26, thus consituting frame 14. The configuration of longitudinal bars 24, in addition to contributing to the effective support of the filter bags, also facilitates their insertion into frame 12, for the reason that they can flex enough to get over projection 20.

It should be pointed out that secondary frame 14 has been shown with only three lengthwise bars 24, because the filter bag is also shown with three support areas 34 which divide bag 16 into four filtration units. Where the said bag 16 is divided into a larger number of filtration units, the said frame 14 will have a corresponding number of bars 24.

Figure 3:
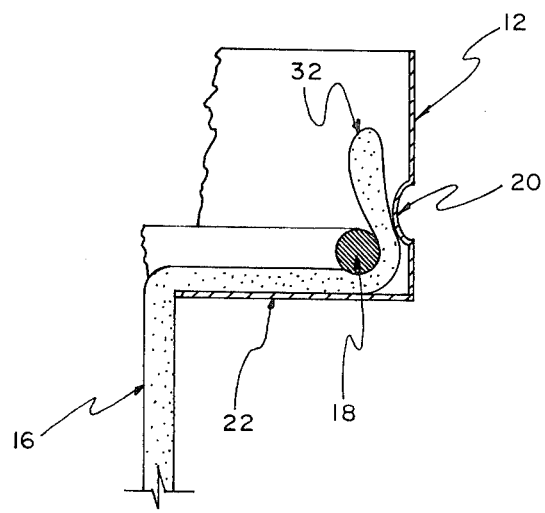
FIG. 3 is a partial view in cross-section illustrating in detail the mounting of the filter bag.

Ring 18, as shown in the embodiment of FIG. 1 has a twist 36 in each of its corners, which tend to expand or open outwardly the walls of the said ring, which makes it ideal for its application, since thereby it contributes to the application of the necessary pressure all around the periphery 32 of filter bag 16, thus assuring the hermetic sealing of its mounting. Said ring 18 is very slightly smaller than frame 12, which fact permits its insertion as well as placing the bag in its supported position, since it is evidently necessary to take into consideration the thickness of projection 32 of said bag 16, as can be observed in attached FIG. 3. The parallel sided locking ring 18 is for retaining telescoped co-action inside the parallel side outer main frame 12 and is so constructed to apply pressure against the mounting lip or periphery 32 of the bag and against inside walls of the parallel sided outer main frame 12 in order to hold the filter bag against the outer main frame. The locking ring thus applies filter retaining forces in two directions, the force being applied by the locking ring against the peripheral projection 20 and the locking ring also exerting a force against the radially inwardly extending interior flange 22.

Figure 4:
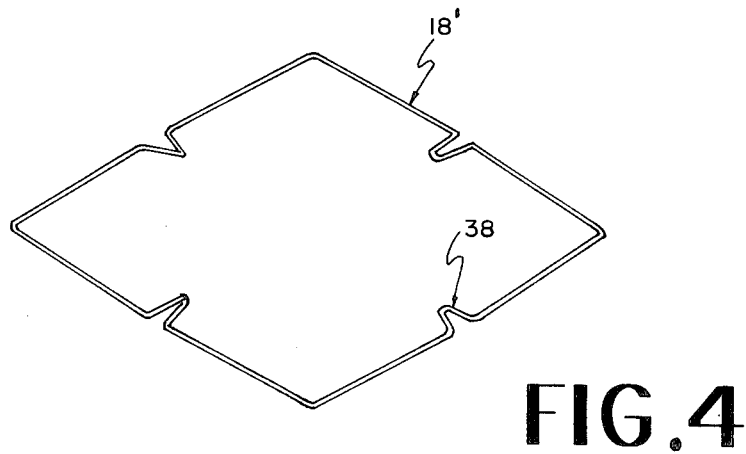
FIG. 4 is a perspective view of the locking ring of a different embodiment of the invention.

In FIG. 4 an additional embodiment of the parallel-sided retainer ring is illustrated, and in this case has been identified with reference 18'. In this embodiment, said ring 18' has on each of its sides an interior bend 38 located approximately at the middle of each side. Bend 38 contributes to expanding the walls of the ring outward, at the same time that it facilitates its positioning in frame 12, since its length must be adapted to slight changes in both the size of the frame and the thickness of projection 32 of filtration bag 16.

Figure 6:
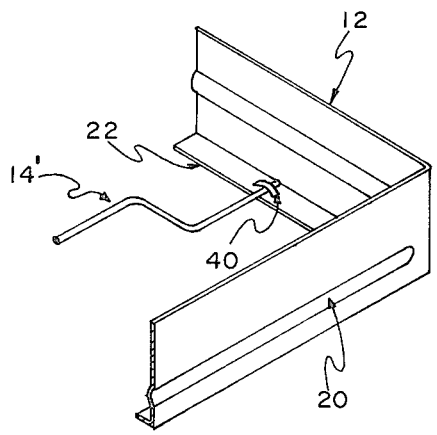
FIG. 6 is a partial view in perspective illustrating the way to mount the element which shapes the support for extending the filter units in accordance with the embodiment illustrated in FIG. 5.
Figure 5:
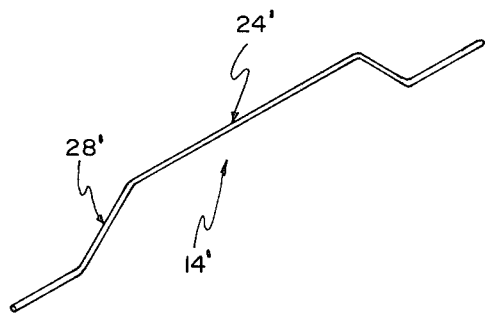
FIG. 5 is a perspective view of still another embodiment of the element making up the supports which assure the opening up of the filter units.

In FIGS. 5 and 6 a variation of support elements 14' is shown, in this embodiment being made up of independent bars 24', whose shape and function are the same as those of secondary frame 14 discussed in reference to FIG. 1. However, their mounting is different, since as can be seen in FIG. 6 there are yokes 40 on at least two sides of frame 12, into which the ends of said bars 14' are inserted. Said yokes 40 are suitably spaced throughout the entire length of projection 22 of frame 12 as is required by the number of filtration elements into which the respective filter bag is divided.

Both secondary frame 14 and independent bars 14' can assume either of two different positions, that is, one position with the crest directed upward, and the other, downward. This permits of placing the filter bags in two different positions with no need of changing the position of frame 12, thus adding to the versatility of the system.

While the invention has been described in detail in regard to its specific embodiments, it will be evident to any person skilled in the art that many changes and modifications can be made without escaping from the spirit and scope thereof; hence it is intended that the said description be taken broadly in every sense, and not restrictively, since its scope is solely that set forth on the following claims.

What I claim is:

1. A four piece apparatus for holding or mounting filter bags and the like comprising:
    an integral parallel-sided outer main frame provided with a radially inwardly extending interior flange and an axially extending outer flange connected thereto;
    a support device of suitable length placed radially inside said axially extending outer flange in overlying relation relative to said interior flange,
    said axialy extending outer flange having an interior radially inwardly extending peripheral porjection positioned at a distance from said radially inwardly extending interior flange and with the support device positioned between said interior flange and said peripheral projection;
    a filter bag having an upper open end defined by a mounting lip and with the bag having several filtration units;
    said support device supporting said filter bag with the main frame by means of the mounting lip; and a parallel sided locking ring telescoped inside the axially extending outer flange between said peripheral projection and said support device such that pressure is applied in two directions, the first direction applying radial pressure against the mounting lip and the peripheral projection, and the second direction applying axial pressure between the mounting lip and the support device.

2. An apparatus for securing or mounting filter bags and the like as set forth in claim 1, in which between said interior flange and the peripheral projection there is sufficient space to permit the mounting of the support device and the locking ring as well as the periphery or mounting lip of the filter bag.

3. An apparatus for securing or mounting filter bags and the like as set forth in claim 1, in which the support device for the filtration units consists of a secondary frame provided with slightly flexed longitudinal bars to assure both support and suitable spreading of the filtration units of said filter bag, as well as to give the adequate projection of the upper parts of filtration material of the several filtration units of the filter bag.

4. An apparatus for securing or mounting filter bags and the like as set forth in claim 1, in which said support device consists of independent bars mounted on the interior flange by means of yokes which permit the said support bars to be freely mounted.

5. An apparatus for securing or mounting filter bags and the like as set forth in claim 1, in which the locking ring exerts pressure against the inside faces of the outer main frame, said locking ring having intermediate slight inside loops in order to secure pressure also in intermediate parts of said outer main frame.

6. An apparatus for securing or mounting filter bags or the like as set forth in claim 5, in which said locking ring has small twists in the corners or as an alternative it has loops in the middle parts of said locking ring for handling purposes.

* * * * *